United States Patent
Hsu (10) Patent No.: US 7,197,001 B2
(45) Date of Patent: Mar. 27, 2007

(54) APPARATUS FOR DETECTING A PRE-PIT SIGNAL

(75) Inventor: Tse-Hsiang Hsu, Hsinchu (TW)

(73) Assignee: MediaTek Inc., Hsin Chu (TW)

( * ) Notice: Subject to any disclaimer, the term of this patent is extended or adjusted under 35 U.S.C. 154(b) by 600 days.

(21) Appl. No.: 10/676,008

(22) Filed: Oct. 2, 2003

(65) Prior Publication Data

US 2004/0066724 A1   Apr. 8, 2004

(30) Foreign Application Priority Data

Oct. 7, 2002   (TW) .............................. 91123155 A (51) Int. Cl.
  *G11B 7/00* (2006.01)
(52) U.S. Cl. ................. 369/59.27; 369/124.1; 369/47.27; 369/47.2
(58) Field of Classification Search ............. 369/124.1, 369/124.15, 44.34, 44.29, 59.27, 44.41, 47.27, 369/47.2
  See application file for complete search history.

(56) References Cited

U.S. PATENT DOCUMENTS

| 5,930,222 | A | 7/1999 | Yoshida et al. |
| 6,122,331 | A | 9/2000 | Dumas et al. |
| 6,992,956 | B2 * | 1/2006 | Minechika et al. ...... 369/47.25 |

FOREIGN PATENT DOCUMENTS

TW   2002-74675   3/2002

* cited by examiner

*Primary Examiner*—Nabil Hindi
(74) *Attorney, Agent, or Firm*—Birch, Stewart, Kolasch & Birch, LLP.

(57) ABSTRACT

An apparatus for detecting a pre-pit signal at different laser power intensities of an optical disk drive. The apparatus includes an amplifier for receiving a push-pull signal acquired from an optical disk to generate an adjusted signal, a multiplexer for receiving the push-pull signal and the adjusted signal and selecting the push-pull signal or the adjusted signal as a slicing signal for output according to a power state signal, and a slicer for receiving the slicing signal and slicing the slicing signal according to a slicing level to generate the pre-pit signal. Thus, the apparatus only needs one set of slicer to correctly slice the pre-pit signal.

11 Claims, 9 Drawing Sheets

APPARATUS FOR DETECTING A PRE-PIT SIGNAL

This nonprovisional application claims priority under 35 U.S.C. § 119(a) on Patent Application No. 091123155 filed in TAIWAN on Oct. 7, 2002, which is herein incorporated by reference.

BACKGROUND OF THE INVENTION

1. Field of the Invention

The invention relates to an apparatus for detecting a pre-pit signal, and more particularly to an apparatus for detecting a pre-pit signal at different laser power intensities by a single slicer.

2. Description of the Related Art

Figure 1A:
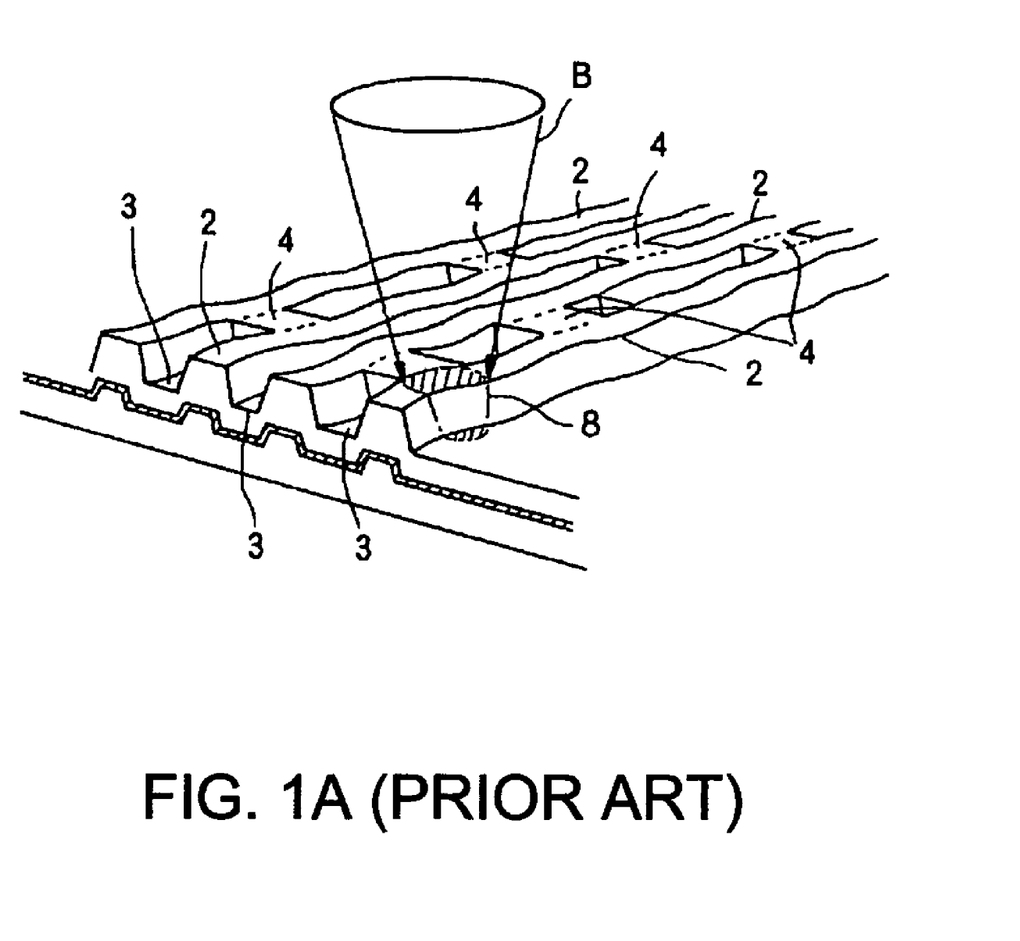
FIG. 1A shows a cross-sectional view of an optical disk.
Figure 1B:
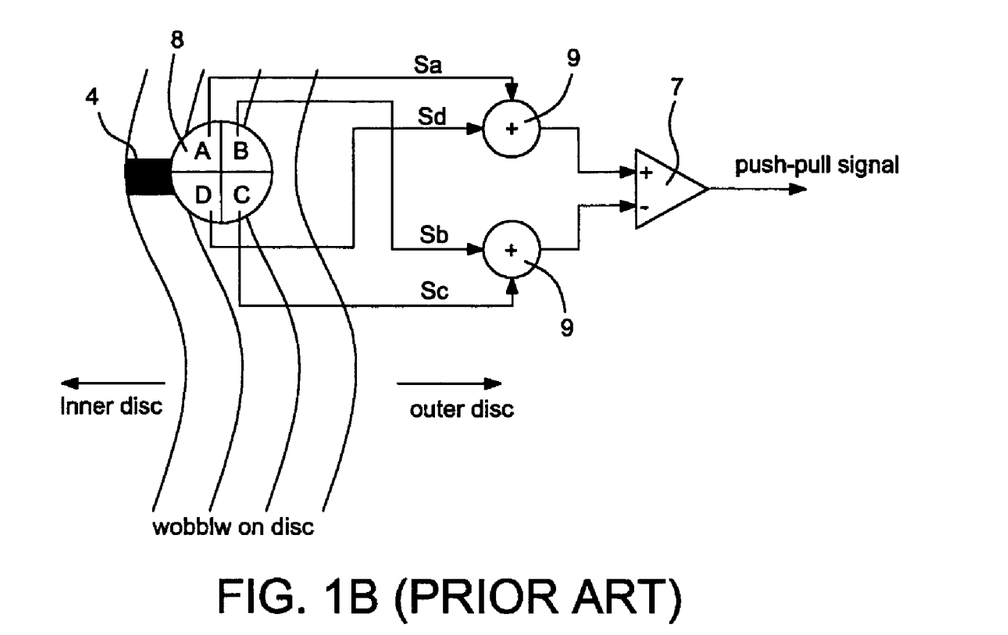
FIG. 1B shows a push-pull signal generator.
Figure 1C:
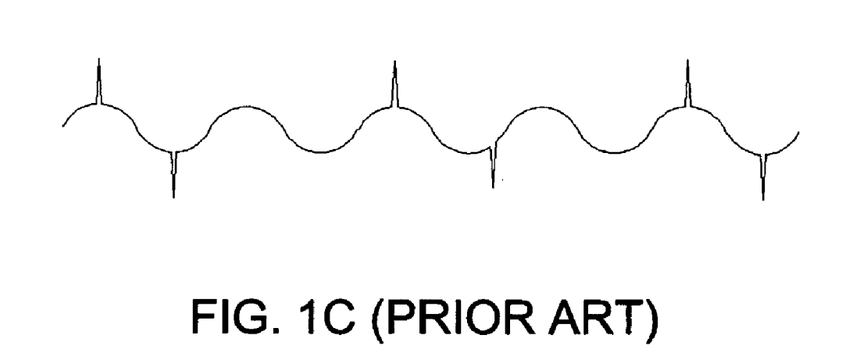
FIG. 1C shows an example of push-pull signal.

In a typical DVD-R (Digital Versatile Disk Recordable), a pre-pit is additionally formed between adjacent tracks to record the address information in order to correctly detect the frequency of the wobbling tracks. FIG. 1A shows a cross-sectional view of an optical disk. As shown in FIG. 1A, the number "2" denotes a groove, the number "3" denotes a land, and the number "4" denotes a pre-pit. Since the pre-pits have been uniformly formed over the entire surface of the DVD-R when it is manufactured, the reference addresses of the DVD-R may be reproduced from the pre-pits. Shown in FIG. 1B, a push-pull signal is generated from the signals of Sa, Sb, Sc and Sd by the equation of (Sa+Sd)−(Sb+Sc), where the Sa, Sb, Sc, and Sd represent the four detecting signal of a photo detector (PD) 8. An example of this push-pull signal is illustrated in FIG. 1C. This push-pull signal contains not only Pre-pit signal but also wobble signal due to the disc track is formed by wobble-like structure. In addition, since the power intensities of the laser beams are switched between high and low power during recording onto disc for generating the information bit "pit" and "land", respectively. Consequently, the level of this push-pull signal depends on recording power intensity, i.e., high power period produces high signal level and low power period generates low signal level. Consequently, the apparatus for detecting the pre-pit signal has to deal with the issue of push-pull signal with being high-low power dependent during recording onto disc.

Figure 2:
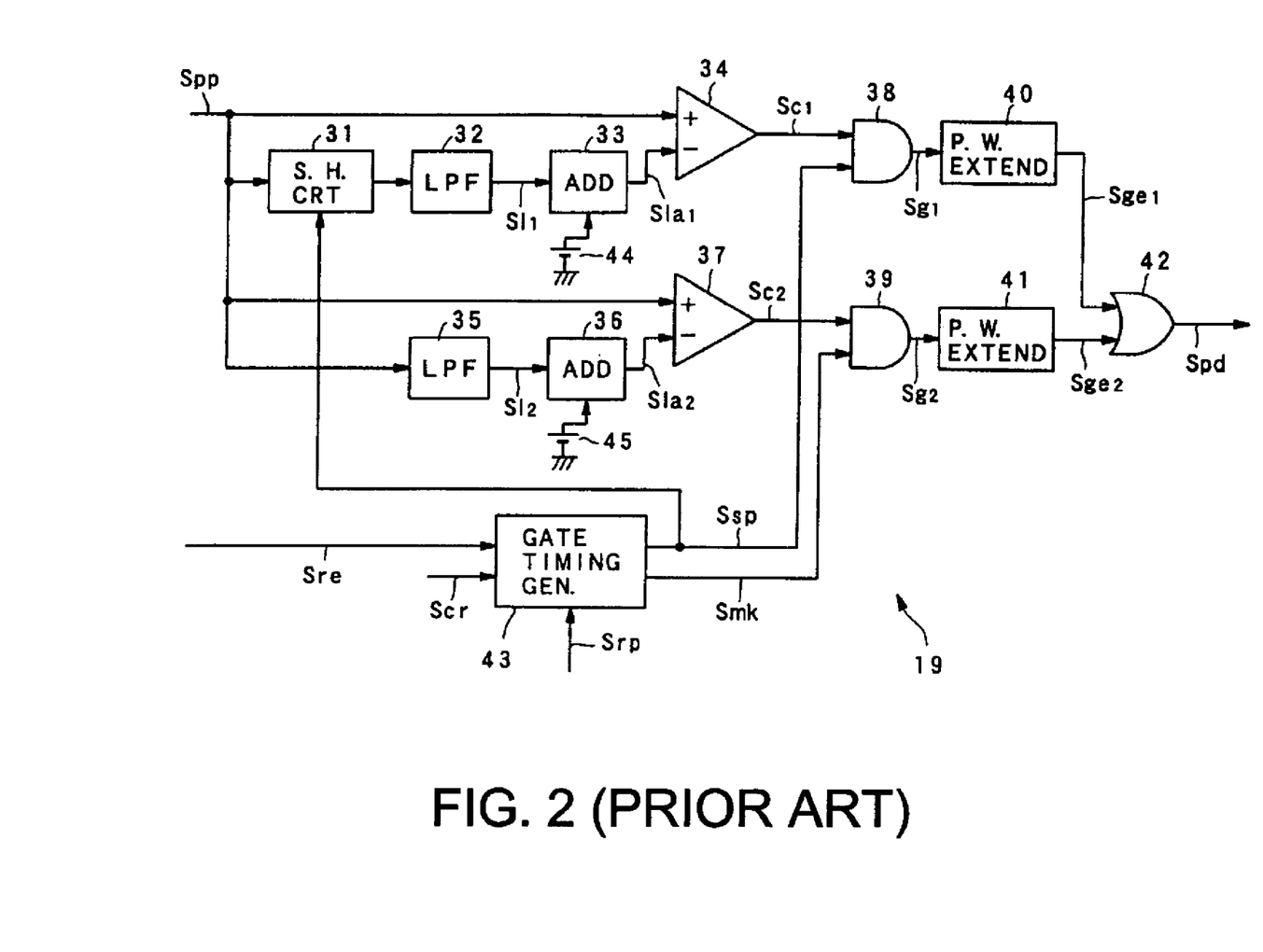
FIG. 2 shows a block diagram of a conventional pre-pit detection apparatus.

U.S. Pat. No. 5,930,222, entitled "Pre-pit detecting device and information recording apparatus employing the same", has proposed a method for detecting the pre-pit signal at a high power state and a low power state by two sets of detection circuits. FIG. 2 shows an architecture diagram of a conventional pre-pit detection apparatus. Referring to FIG. 2, the pre-pit detection apparatus 19 includes a first comparator 34 for receiving a push-pull signal and generating a first comparison signal Sc1, a second comparator 37 for receiving the push-pull signal and generating a second comparison signal Sc2, a timing generator 43 for generating a timing control signal, and a set of logic circuit for outputting the pre-pit signal Spd according to the timing control signal. The pre-pit detection apparatus 19 further employs a first low-pass filter 32 and a first adder 33 to generate a first slicing level Sla1, and a second low-pass filter 35 and a second adder 36 to generate a second slicing level Sla2. The timing generator 43 outputs a control signal Ssp to a sample and hold circuit 31 according to different power states so as to generate the first comparison signal Sc1 by the first comparator 34 at the low power state.

The method of the above-mentioned patent may be free from being influenced by different power magnitudes of the laser beams at the different power intensities. However, the drawbacks thereof are that more circuits are needed and the cost is high. For example, an additional set of detection circuit is needed.

SUMMARY OF THE INVENTION

In view of the above-mentioned problems, it is therefore an object of the invention to provide an apparatus for adjusting a push-pull signal by an amplifier, and detecting a pre-pit signal at different power intensities by a single detection circuit.

To achieve the above-mentioned object, the detection apparatus of the invention includes an amplifier for receiving a push-pull signal acquired from an optical disk to generate an adjusted signal, a multiplexer for receiving the push-pull signal and the adjusted signal and selecting the push-pull signal or the adjusted signal as a slicing signal for output according to a power state signal, and a slicing unit for receiving the incoming signal and slicing it to generate the pre-pit signal according to a slicing level. Thus, the apparatus for detecting the pre-pit signal of the invention only needs one set of slicing unit to correctly slice the pre-pit signal.

BRIEF DESCRIPTION OF THE DRAWINGS

FIG. 6 shows schematic illustrations of associated waveforms, wherein

FIG. 7 shows partially enlarged illustrations of parts of the waveforms of FIG. 6, wherein

FIG. 8 shows partially enlarged illustrations of the other parts of the waveforms of FIG. 6, wherein

DETAILED DESCRIPTION OF THE INVENTION

The apparatus of the invention for detecting a pre-pit signal will be described with reference to the accompanying drawings. Since the power intensities of the laser beams of the optical disk may be different when a disk drive is recording, the magnitudes of the push-pull signal, which are reflected and acquired from the optical disk, are also different. The invention utilizes an amplifier to adjust the amplitude of the push-pull signal at different power intensities, such that the slicing signals input to the slicer at different states have substantially equal peak values. Consequently, the invention only needs one set of slicer to correctly slice the pre-pit signal.

Figure 3:
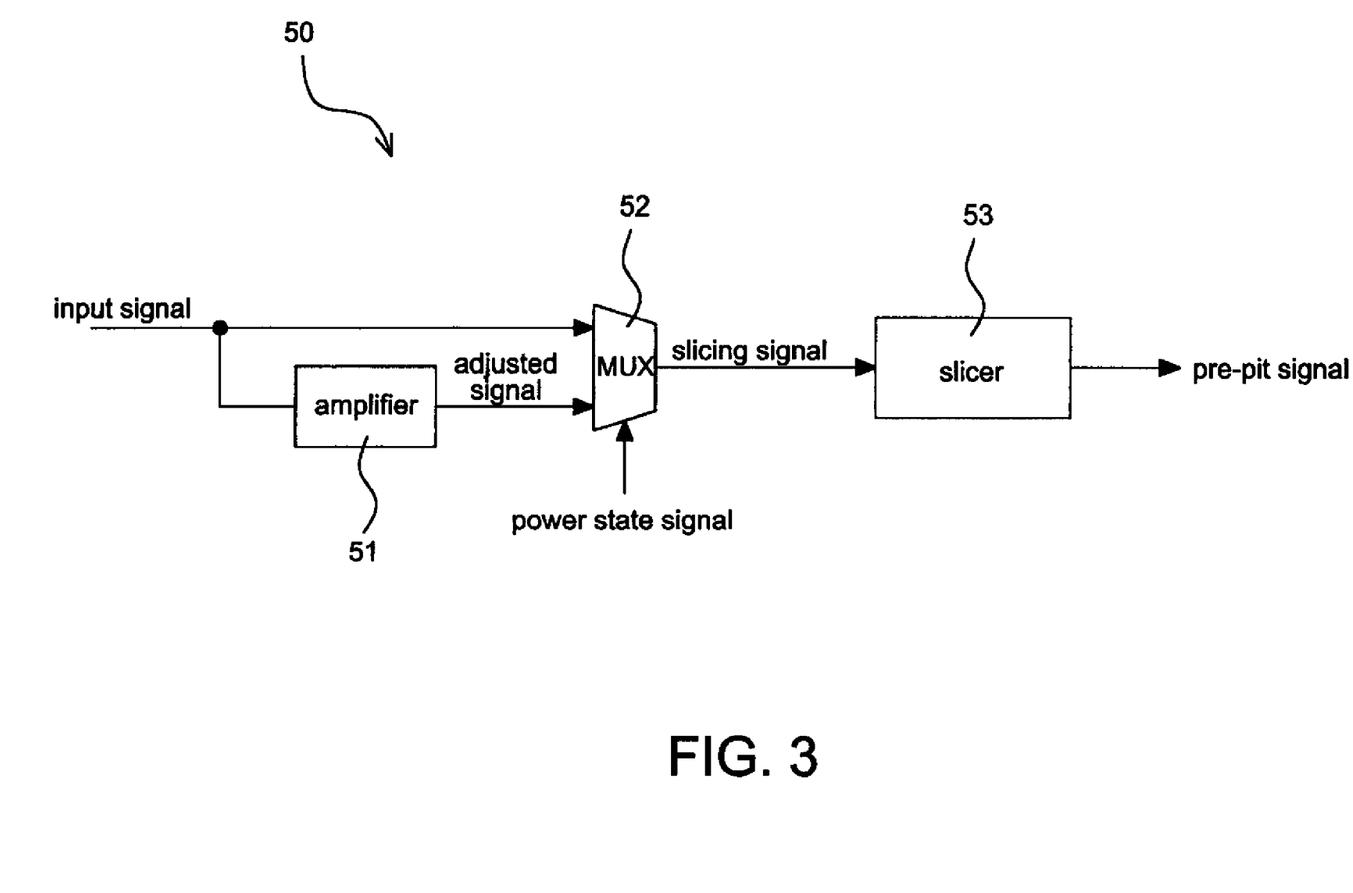
FIG. 3 shows a block diagram of an apparatus for detecting a pre-pit signal according to a first embodiment of the present invention.

FIG. 3 is a block diagram of an apparatus for detecting a pre-pit signal according to a first embodiment of the present invention. Referring to FIG. 3, the apparatus 50 for detecting a pre-pit signal according to the first embodiment of the invention includes an amplifier 51, a multiplexer 52, and a slicer 53. The amplifier 51 receives the push-pull signal, which is reflected and acquired from the optical disk, adjusts the magnitude of the signal, and outputs an adjusted signal. For instance, when the amplifier 51 is utilized to adjust the push-pull signal at a high power state, the amplifier 51 attenuates the push-pull signal such that the magnitude of the attenuated push-pull signal is substantially equal to a peak value of the push-pull signal at a low power state. When the amplifier 51 is utilized to adjust the push-pull signal of the low power state, the amplifier 51 amplifies the push-pull signal such that the magnitude of the amplified push-pull signal is substantially equal to a peak value of the push-pull signal at the high power state.

Then, the detection apparatus 50 utilizes the multiplexer 52 to select an unadjusted push-pull signal or the adjusted push-pull signal as the slicing signal for output according to the power state signal. For instance, when the amplifier 51 is utilized to adjust the push-pull signal at the high power state, the multiplexer 52 selects the output signal (adjusted signal) of the amplifier 51 at the high power state, and selects the push-pull signal at the low power state. When the amplifier 51 is utilized to adjust the push-pull signal of the low power state, the multiplexer 52 selects the output signal (adjusted signal) of the amplifier 51 at the low power state, and selects the push-pull signal at the high power state. Finally, the detection apparatus 50 utilizes the slicer 53 to slice the slicing signal output from the multiplexer 52, and the pre-pit signal is correctly generated accordingly.

Figure 4:
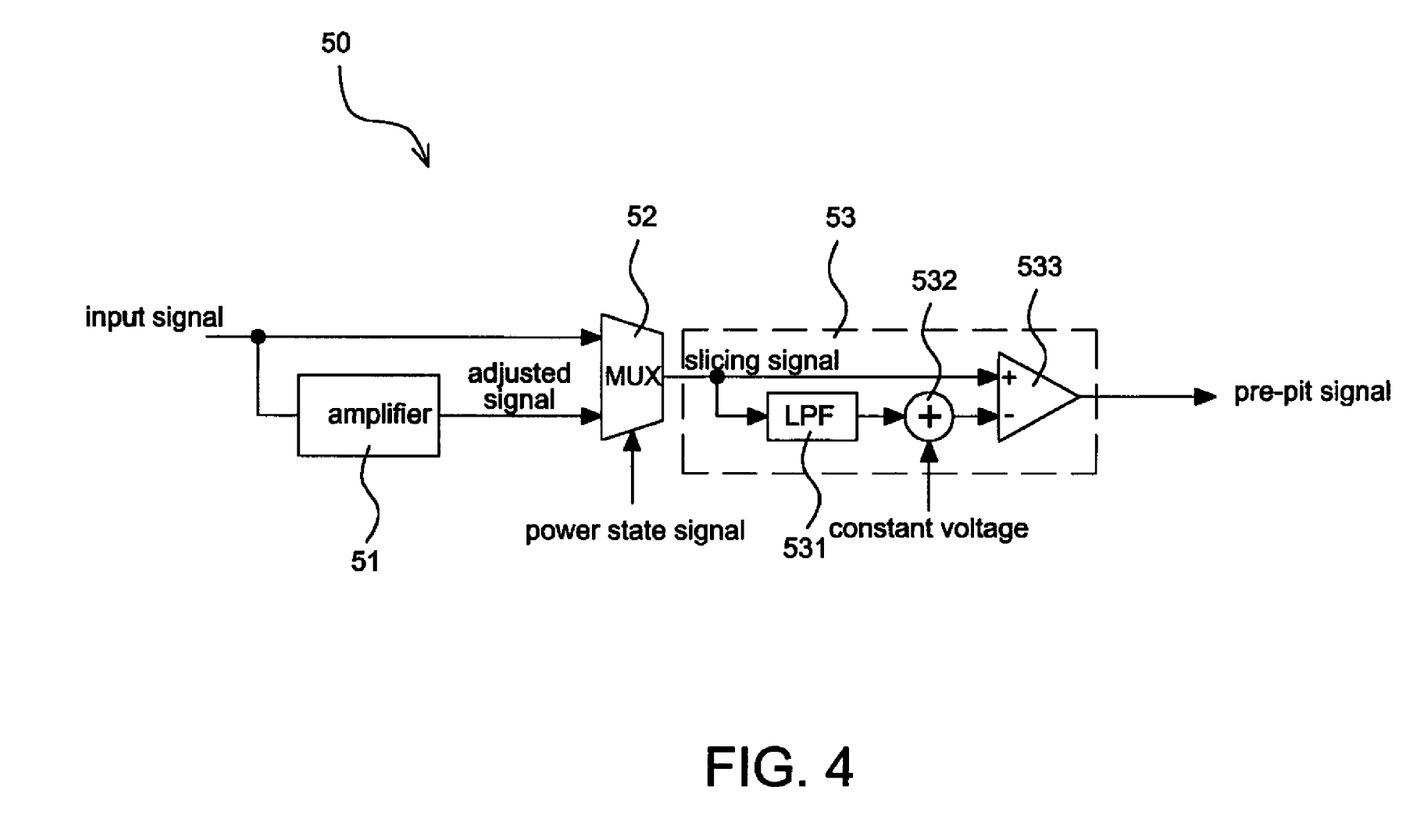
FIG. 4 shows an embodiment of a slicer in the apparatus for detecting the pre-pit signal of the invention.

FIG. 4 shows an embodiment of a slicer in the apparatus for detecting the pre-pit signal of the invention. Referring to FIG. 4, the slicer 53 includes a low-pass filter 531, an adder 532, and a comparator 533. The low-pass filter 531 receives the slicing signal and generates an average signal of the slicing signal. The adder 532 adds a constant voltage to the average signal to generate a slicing voltage. The comparator 533 receives the slicing signal and the slicing voltage, and outputs the pre-pit signal. The comparator 533 outputs a high level when the slicing signal is greater than the slicing voltage, and a low level when the slicing signal is smaller than the slicing voltage. Of course, the operation of the slicer is not limited to this manner. For example, the slicing voltage may be generated in other manners.

Figure 5:
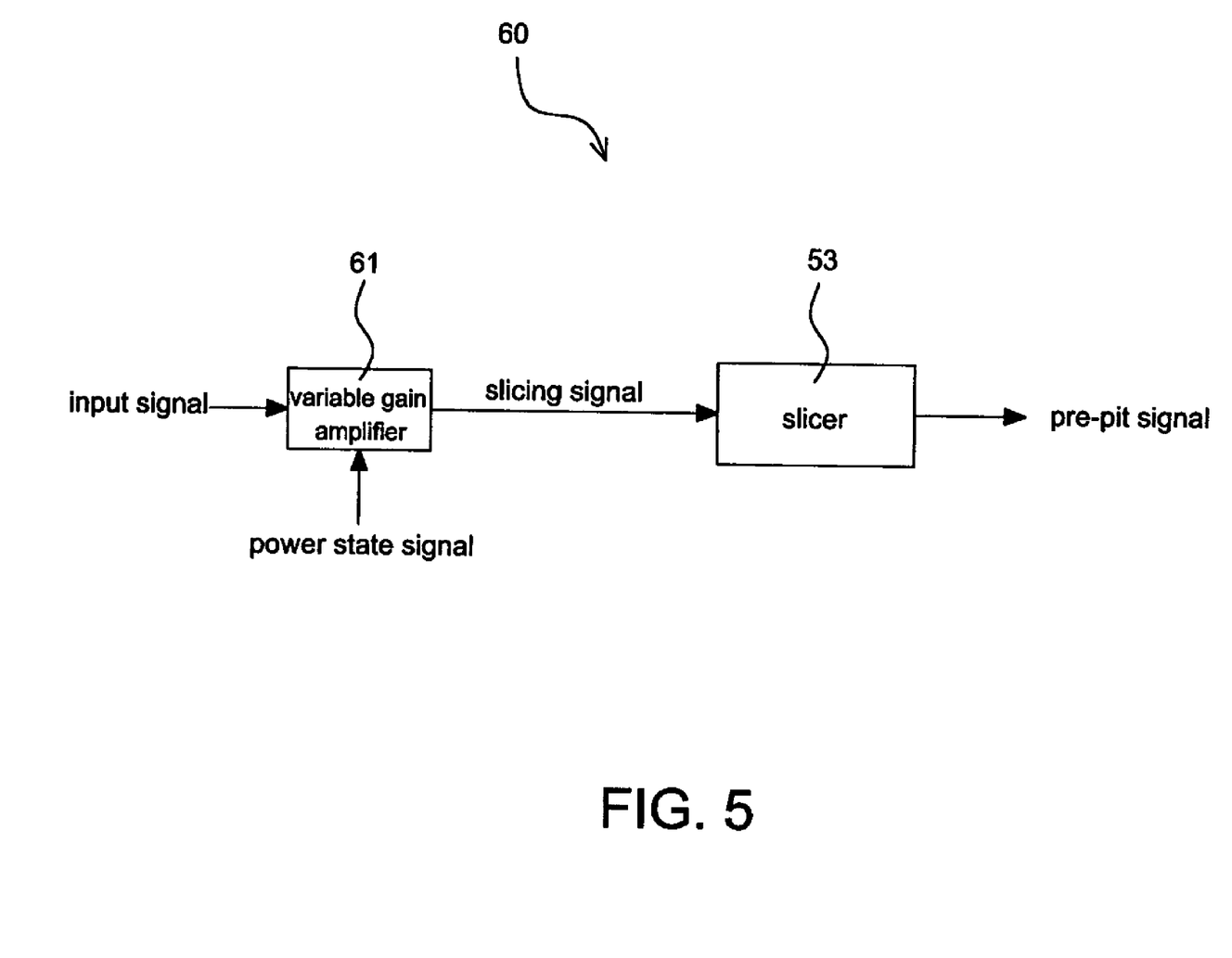
FIG. 5 shows a block diagram of an apparatus for detecting a pre-pit signal according to a second embodiment of the present invention.

FIG. 5 shows an architecture diagram of an apparatus for detecting a pre-pit signal according to a second embodiment of the present invention. Referring to FIG. 5, the apparatus 60 of the invention for detecting a pre-pit signal includes a variable gain amplifier 61 and a slicer 53. The variable gain amplifier 61 receives the push-pull signal, adjusts the magnitude of the push-pull signal by different gain according to the power state signal, and outputs the slicing signal. The gain of the variable gain amplifier 61 at the high power state is smaller than that at the low power state, such that the slicing signal output by the variable gain amplifier 61 has substantially equal magnitudes at whichever power states.

Figure 6A:
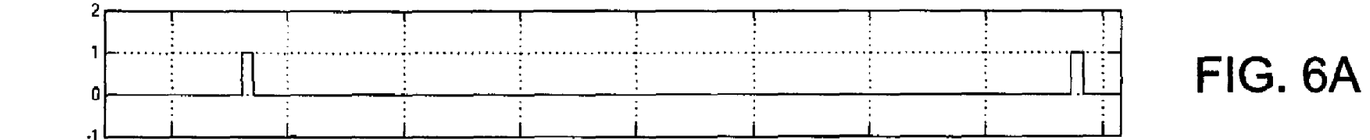
FIG. 6A shows the pre-pit signal.
Figure 6B:
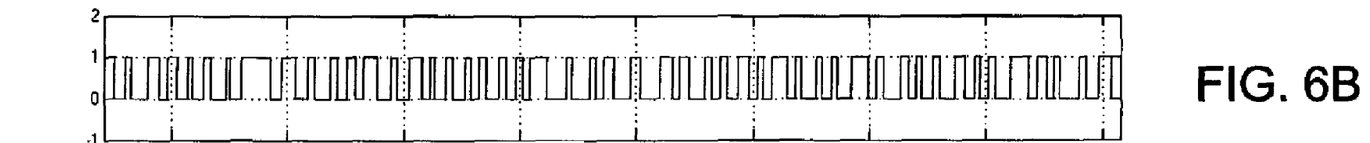
FIG. 6B shows the power state signal.
Figure 6C:
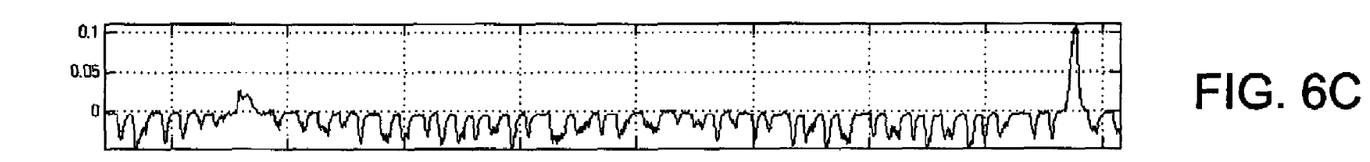
FIG. 6C shows the push-pull signal.
Figure 6D:
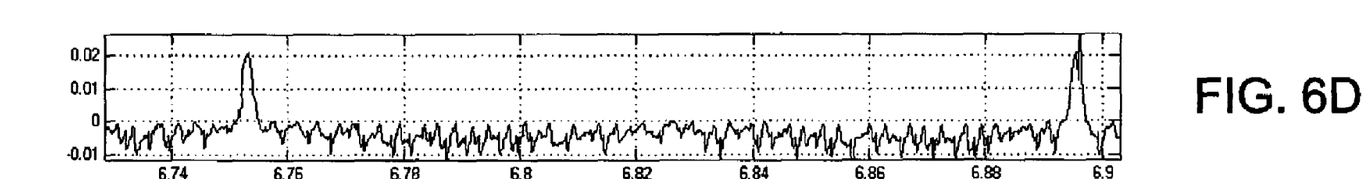
FIG. 6D shows the slicing signal.

FIGS. 6A~6D show schematic illustrations of associated waveforms generated by the apparatus of the invention for detecting the pre-pit signal, wherein FIG. 6A shows the pre-pit signal, FIG. 6B shows the power state signal, FIG. 6C shows the wobble signal, and FIG. 6D shows the slicing signal. FIGS. 7A~7D show partially enlarged illustrations from time 6.745 to 6.77 of FIGS. 6A~6D, respectively, and FIGS. 8A~8D show partially enlarged illustrations from time 6.875 to 6.9 of FIGS. 6A~6D, respectively.

Figure 7A:
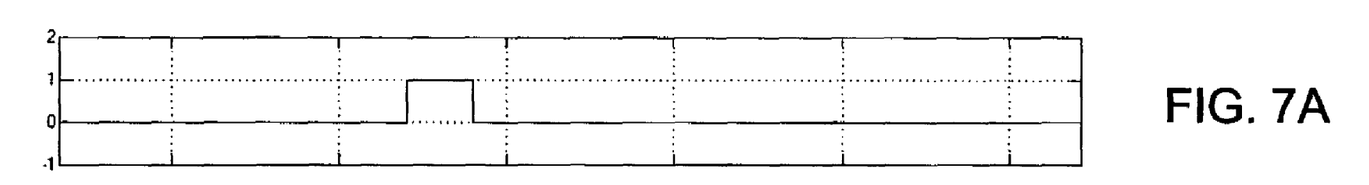
FIG. 7A shows the pre-pit signal.
Figure 7B:
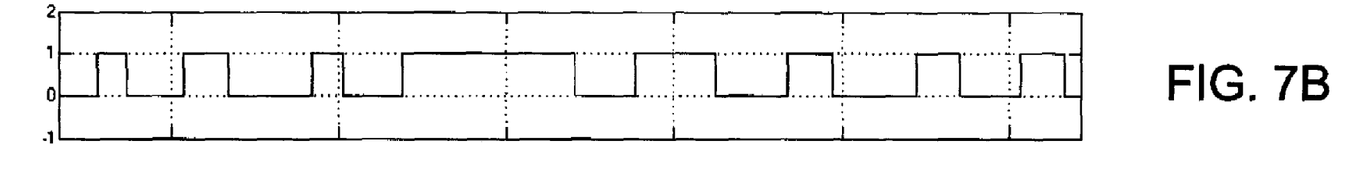
FIG. 7B shows the power state signal.
Figure 7C:
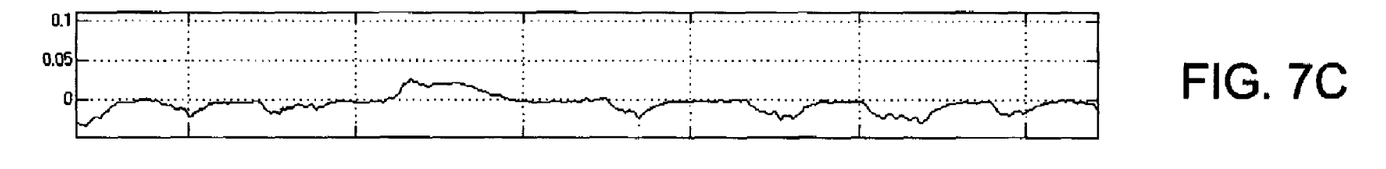
FIG. 7C shows the push-pull signal.
Figure 7D:
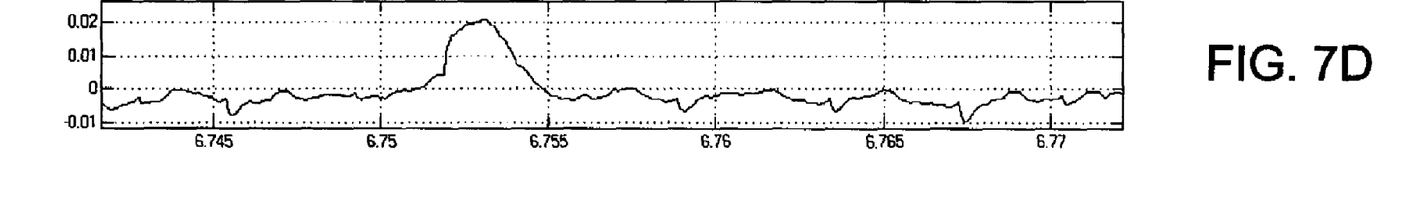
FIG. 7D shows the slicing signal.
Figure 8A:
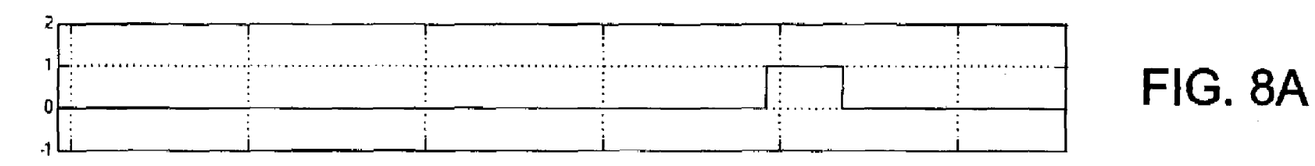
FIG. 8A shows the pre-pit signal.
Figure 8B:
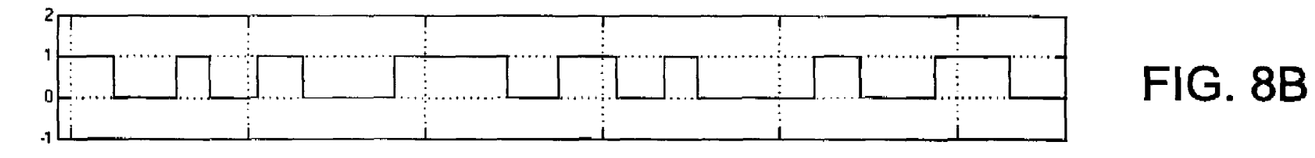
FIG. 8B shows the power state signal.
Figure 8C:
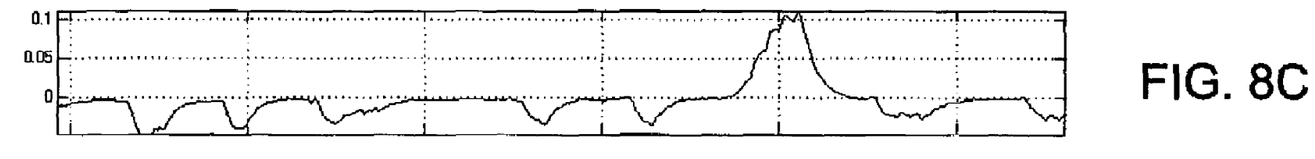
FIG. 8C shows the push-pull signal.
Figure 8D:
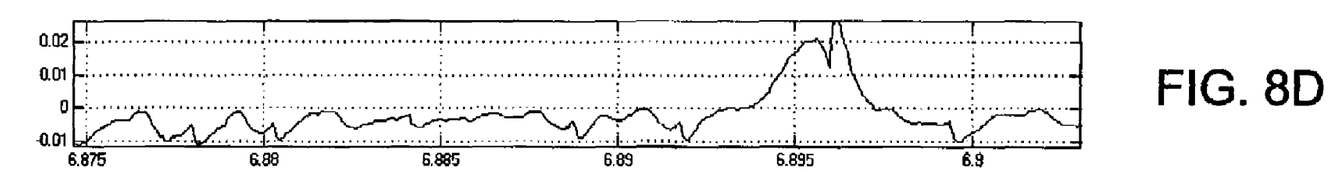
FIG. 8D shows the slicing signal.

In the power state signal of FIGS. 6B, 7B, and 8B, "1" denotes the low power state and "0" denotes the high power state. As shown in FIG. 6C, the wobble signal has an upward pre-pit pulse between time 6.745 to 6.77, and the state is the low power state. In addition, the wobble signal also has an upward pre-pit pulse between time 6.875 to 6.9, and the state is the high power state. Since the states are different, the peak values of the two pulses are also different, wherein one of the peak values is about 0.02, and the other is about 0.1, which is five times greater than 0.02. Consequently, the invention employs the amplifier to attenuate the wobble signal at the writing state to ⅕ times of the original one, as shown in FIGS. 6D and 8D. The peak value of the slicing signal is substantially equal to 0.02 at either the reading state or the writing state. Of course, it is also possible to employ the amplifier to amplify the wobble signal at the reading state to five times of the original one, such that the peak value of the slicing signal is kept at about 0.1 at either the reading state or the writing state. Consequently, the apparatus of the invention for detecting the pre-pit signal only needs a set of slicer to correctly slice the pre-pit signal.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. An apparatus for detecting a pre-pit signal at different laser power intensities of an optical disk drive, the apparatus comprising:
   an amplifier for receiving a push-pull signal acquired from the optical disk to generate an adjusted signal;
   a multiplexer for receiving the push-pull signal and the adjusted signal, selecting the push-pull signal or the adjusted signal according to a power state signal, and generating a slicing signal; and
   a slicer for receiving the slicing signal and slicing the slicing signal according to a slicing level to generate the pre-pit signal.

2. The apparatus according to claim 1, wherein the power state signal comprises a low power state and a high power state.

3. The apparatus according to claim 2, wherein the amplifier attenuates the push-pull signal to make a peak value of the adjusted signal at the high power state substantially approximately equal to a peak value of the push-pull signal at the low power state.

4. The apparatus according to claim 3, wherein the multiplexer selects the push-pull signal for output when the power state signal represents the low power state, and selects the adjusted signal for output when the power state signal represents the high power state.

5. The apparatus according to claim 2, wherein the amplifier amplifies the push-pull signal to make a peak value of the adjusted signal at the low power state substantially equal to a peak value of the push-pull signal at the high power state.

6. The apparatus according to claim 5, wherein the multiplexer selects the adjusted signal for output when the power state signal represents the low power state, and selects the push-pull signal for output when the power state signal represents the high power state.

7. The apparatus according to claim 2, further comprising a second amplifier for receiving the push-pull signal and generating a second adjusted signal, which is input to the multiplexer to replace the push-pull signal.

8. An apparatus for detecting a pre-pit signal at different laser power intensities of an optical disk drive, the apparatus comprising:

a variable gain amplifier for receiving a push-pull signal acquired from an optical disk and adjusting the wobble push-pull signal by different gain values according to a power state signal to generate a slicing signal; and a slicing unit for receiving the slicing signal output from the variable gain amplifier and slicing the slicing signal according to a slicing level to generate the pre-pit signal.

9. The apparatus according to claim 8, wherein the power state signal comprises a low power state and a high power state.

10. The apparatus according to claim 9, wherein the gain value of the variable gain amplifier at the high power state is smaller than that at the low power state.

11. The apparatus according to claim 10, wherein a peak value of the slicing signal output from the variable gain amplifier at the low power state is substantially equal to that at the high power state.

* * * * *